(12) United States Patent  (10) Patent No.: US 12,345,561 B2
Sato et al.  (45) Date of Patent: Jul. 1, 2025

(54) INCLINATION DETECTING METHOD AND APPARATUS FOR THE SAME

(71) Applicant: A&D COMPANY, LIMITED, Tokyo (JP)

(72) Inventors: Yoshikuni Sato, Saitama (JP); Yoshikazu Nagane, Saitama (JP); Satoshi Suzaki, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 390 days.

(21) Appl. No.: 17/914,665

(22) PCT Filed: Apr. 15, 2020

(86) PCT No.: PCT/JP2020/016508
§ 371 (c)(1),
(2) Date: Sep. 26, 2022

(87) PCT Pub. No.: WO2021/210084
PCT Pub. Date: Oct. 21, 2021

(65) Prior Publication Data
US 2023/0126732 A1  Apr. 27, 2023

(51) Int. Cl.
*G01G 23/10* (2006.01)
*G01B 7/30* (2006.01)
(Continued)

(52) U.S. Cl.
CPC ............... *G01G 19/52* (2013.01); *G01B 7/30* (2013.01); *G01G 23/002* (2013.01);
(Continued)

(58) Field of Classification Search
CPC .... G01G 23/01–23/017; G01G 23/002; G01G 19/52; G01G 23/14; G01G 23/42; G01B 7/30; G06F 7/30
See application file for complete search history.

(56) References Cited

U.S. PATENT DOCUMENTS 3,826,319 A * 7/1974 Loshbough ............ G01G 23/46
177/25.15
4,750,574 A * 6/1988 Williams ............. G01G 23/002
177/25.19
(Continued)

FOREIGN PATENT DOCUMENTS

JP  03-205518 A  9/1991
JP  2003-254818 A  9/2003
(Continued)

OTHER PUBLICATIONS

International Search Report and Written Opinion issued in the corresponding Application No. PCT/JP2020/016508 issued on Jun. 2, 2020; 2 pages.

*Primary Examiner* — Randy W Gibson
(74) *Attorney, Agent, or Firm* — Studebaker Brackett PLLC

(57) ABSTRACT

An inclination of a weighing apparatus is automatically detected by the apparatus itself while preventing an increase in the number of components. In order to achieve the object described above, a weighing apparatus includes a weight sensor, a built-in weight to be loaded on the weight sensor, an adding/removing unit for adding/removing the built-in weight, a memory storing a theoretical value of the built-in weight, and an arithmetic processing unit, wherein the arithmetic processing unit includes an inclination angle computing unit configured to obtain an apparatus inclination angle from an arc-cosine of a weighing value of the built-in weight and the theoretical value of the built-in weight.

14 Claims, 10 Drawing Sheets

(51) Int. Cl.
*G01G 19/52* (2006.01)
*G01G 23/00* (2006.01)
*G01G 23/01* (2006.01)
*G01G 23/14* (2006.01)
*G01G 23/42* (2006.01)
*G01G 23/48* (2006.01)
*G06F 7/02* (2006.01)

(52) U.S. Cl.
CPC ........... *G01G 23/012* (2013.01); *G01G 23/10* (2013.01); *G01G 23/14* (2013.01); *G01G 23/42* (2013.01); *G01G 23/48* (2013.01); *G06F 7/026* (2013.01)

(56) References Cited

U.S. PATENT DOCUMENTS

| | | | | |
|---|---|---|---|---|
| 4,890,246 | A * | 12/1989 | Oldendorf | G01G 23/48 177/1 |
| 5,161,628 | A * | 11/1992 | Wirth | G01G 23/002 177/199 |
| 6,137,065 | A * | 10/2000 | Zefira | G01G 23/002 33/366.26 |
| 7,395,689 | B2 * | 7/2008 | Genoud | G01G 23/012 73/1.13 |
| 2008/0314648 | A1 | 12/2008 | Suzuki et al. | |
| 2009/0242279 | A1 | 10/2009 | Freydank et al. | |
| 2011/0119028 | A1 | 5/2011 | Bishop | |
| 2016/0040989 | A1 | 2/2016 | Wang et al. | |
| 2017/0205272 | A1 | 7/2017 | Zhang et al. | |

FOREIGN PATENT DOCUMENTS

| | | |
|---|---|---|
| JP | 2010-078439 A | 4/2010 |
| WO | 199425834 A1 | 11/1994 |

* cited by examiner

The apparatus may not be installed horizontally.
Check level gauge and perform leveling.

Sensitivity for weighing value has changed.
It is recommended to execute calibration.

The apparatus may not be installed horizontally.
Check level gauge and perform leveling.

The apparatus may not be installed horizontally.
Check level gauge and perform leveling.
Sensitivity for weighing value has also changed.
It is recommended to perform calibration after leveling.

INCLINATION DETECTING METHOD AND APPARATUS FOR THE SAME

TECHNICAL FIELD

The present invention relates to a method for detecting an inclination of a weighing apparatus, and a weighing apparatus for the same.

BACKGROUND ART

For correct weighing by a weighing apparatus such as a balance, the apparatus needs to be installed horizontally. As a method for detecting an inclination of a weighing apparatus, bubble levels have been used in many cases, and in recent years, a weighing apparatus that detects an inclination by reading a bubble position by an optical sensor (Patent Literature 1) is available. A weighing apparatus that detects an inclination by respectively disposing weight sensors on four legs of the apparatus and comparing measurement data of the four weight sensors with respective reference data is also available (Patent Literature 2).

CITATION LIST

Patent Literatures

[Patent Literature 1] Japanese Published Unexamined Patent Application No. 2016-38377
[Patent Literature 2] Japanese Published Unexamined Patent Application No. 2010-78439

SUMMARY OF INVENTION

Technical Problem

However, for inclination detection, in Patent Literature 1, an optical sensor needs to be added, and in Patent Literature 2, weight sensors need to be added at four positions. This poses a problem in which the number of components increases, and the apparatus configuration becomes complicated.

An object of the present invention is, to solve the problem described above, to provide a method for automatically detecting an inclination of a weighing apparatus by the apparatus itself without an increase in the number of components, and a weighing apparatus for the same.

Solution to Problem

In order to solve the problem described above, a weighing apparatus according to an aspect of the present invention includes a weight sensor, a built-in weight to be loaded on the weight sensor, an adding/removing unit for adding/removing the built-in weight, a memory storing a theoretical value of the built-in weight, and an arithmetic processing unit, wherein the arithmetic processing unit includes an inclination angle computing unit configured to obtain an apparatus inclination angle from an arc-cosine of a weighing value of the built-in weight and the theoretical value of the built-in weight.

In the aspect described above, it is also preferable that the arithmetic processing unit further includes an inclination angle determining unit configured to compare the apparatus inclination angle with an allowable inclination threshold, and a warning unit configured to issue a warning to prompt leveling when the inclination angle determining unit determines that there is a problem.

In the aspect described above, it is also preferable that the weighing apparatus further includes a temperature sensor, and a specification value of sensitivity drift caused by a temperature change and a temperature measurement value of the temperature sensor are stored in the memory, and the arithmetic processing unit includes a sensitivity drift computing unit configured to compute a sensitivity drift value by multiplying the theoretical value of the built-in weight by the specification value of the sensitivity drift and a difference between a current temperature measurement value of the temperature sensor and a temperature measurement value acquired at the time of execution of a previous calibration, and the inclination angle computing unit obtains the apparatus inclination angle after subtracting the sensitivity drift value from the theoretical value of the built-in weight.

In the aspect described above, it is also preferable that the arithmetic processing unit further includes an inclination angle determining unit configured to compare the apparatus inclination angle with an allowable inclination threshold, a sensitivity drift determining unit configured to compare the sensitivity drift value with an allowable drift threshold when the inclination angle determining unit determines that there is a problem, and a warning unit configured to issue a warning to prompt leveling when the inclination angle determining unit determines that there is a problem, and issue a warning to prompt a calibration when the sensitivity drift determining unit determines that there is a problem.

In the aspect described above, it is also preferable that an inclination abnormality threshold for suspecting a change in gravitational acceleration is further stored in the memory, and the arithmetic processing unit includes an inclination angle additional determining unit configured to compare the apparatus inclination angle with the inclination abnormality threshold, and the warning unit issues a warning to prompt a calibration for correcting a change in gravitational acceleration when the inclination angle additional determining unit determines that there is a problem.

In order to solve the problem described above, an inclination detecting method according to an aspect of the present invention includes a step (A) of adding/removing a built-in weight to/from a weight sensor, a step (B) of calculating a weighing value of the built-in weight, and a step (C) of obtaining an apparatus inclination angle from an arc-cosine of the weighing value of the built-in weight and a theoretical value of the built-in weight.

In the aspect described above, it is also preferable that the inclination detecting method further includes a step (D) of issuing a warning to prompt leveling when the apparatus inclination angle exceeds an allowable inclination threshold.

In the aspect described above, it is also preferable that the inclination detecting method includes, before the step (C), a step (E) of computing a sensitivity drift value by multiplying the theoretical value of the built-in weight by a specification value of the sensitivity drift and a difference between a current temperature measurement value of the temperature sensor and a temperature measurement value acquired at the time of execution of a previous calibration, and in the step (C), the apparatus inclination angle is obtained after subtracting the sensitivity drift value from the theoretical value of the built-in weight.

In the aspect described above, it is also preferable that the inclination detecting method further includes a step (F) of issuing a warning to prompt a calibration when the sensitivity drift value in the step (E) exceeds an allowable drift threshold.

In the aspect described above, it is also preferable that the inclination detecting method further includes, after the step (C), a step (G) of prompting a calibration for correcting a change in gravitational acceleration when the apparatus inclination angle exceeds an inclination abnormality threshold for suspecting a change in gravitational acceleration.

Advantageous Effects of Invention

According to the present invention, a weighing apparatus itself can automatically detect an inclination of the apparatus while preventing an increase in the number of components.

DESCRIPTION OF EMBODIMENTS

Next, preferred embodiments of the present invention will be described based on the drawings.

First Embodiment

Figure 1:
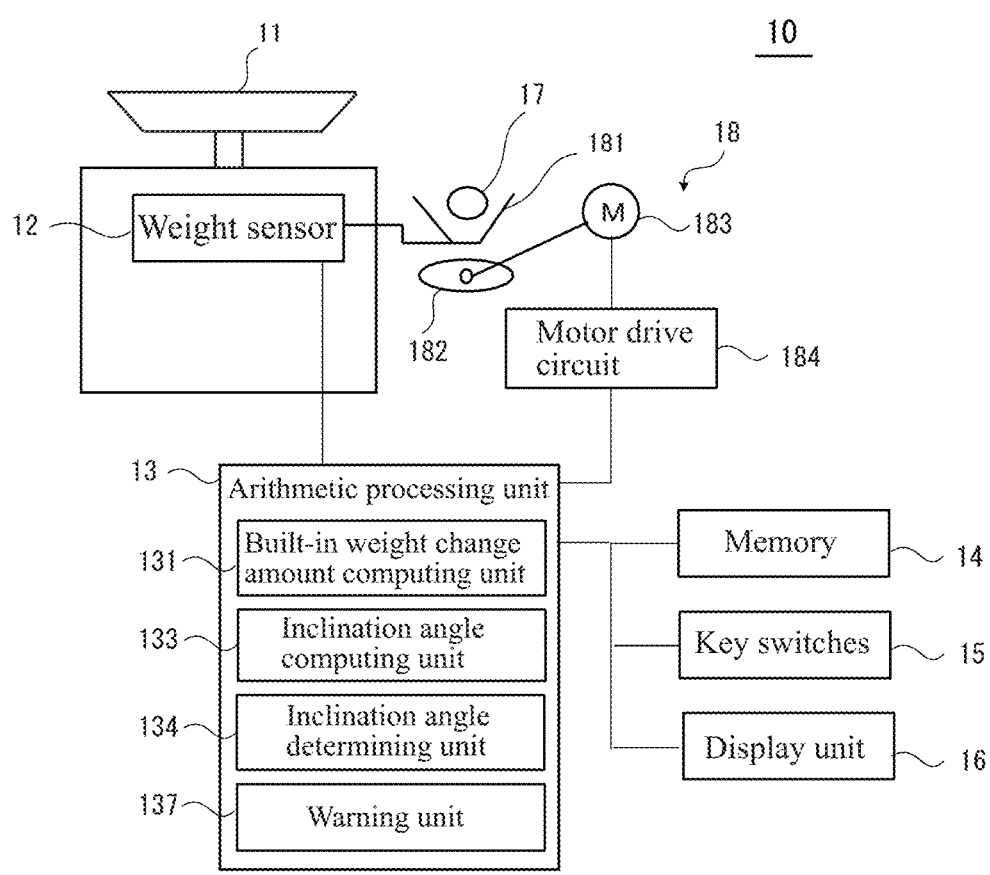
FIG. 1 is a configuration block diagram of a weighing apparatus according to a first embodiment.

FIG. 1 is a configuration block diagram of a weighing apparatus according to a first embodiment. The weighing apparatus (hereinafter, referred to as balance 10) is an electronic balance. The balance 10 includes a weighing pan 11, a weight sensor 12, an arithmetic processing unit 13, a memory 14, key switches 15, a display unit 16, a built-in weight 17, and an adding/removing unit 18.

As the weight sensor 12, an electromagnetic balancing type, a strain gauge type, a capacitance type, or the like is used. To the weight sensor 12, a load of a weighing object placed on the weighing pan 11 is transmitted through a beam (not illustrated). The load detected by the weight sensor 12 is analog-output as weighing data, A/D converted, and output to the arithmetic processing unit 13.

The built-in weight 17 is commonly used in balances with an automatic calibration function. The built-in weight 17 is loaded/unloaded by the adding/removing unit 18. The adding/removing unit 18 includes a built-in weight receiver portion 181, a cam 182, a motor 183, and a motor drive circuit 184. The built-in weight receiver portion 181 is linked to the beam connected to the weight sensor 12, and a load of the built-in weight 17 loaded on the built-in weight receiver portion 181 is transmitted to the weight sensor 12. The motor drive circuit 184 is connected to the arithmetic processing unit 13, and the adding/removing unit 18 lifts/lowers the built-in weight receiver portion 181 by rotating the cam 182 by driving the motor 183 according to a command from the arithmetic processing unit 13, and loads/unloads the built-in weight 17 on/from the built-in weight receiver portion 181. For the adding/removing unit 18, a pump type may be adopted as a drive unit.

The key switches 15 and the display unit 16 are connected to the arithmetic processing unit 13, and are provided on a front side surface of a main body case of the balance 10. From the key switches 15, the balance 10 can be operated. On the display unit 16, weighing values and warnings to be described later are displayed.

The arithmetic processing unit 13 is a microcontroller configured by mounting, for example, a CPU, a ROM, a RAM, etc., on an integrated circuit. The arithmetic processing unit 13 calculates weighing data detected by the weight sensor 12 as a weighing value, records the weighing value in the memory 14 and displays it on the display unit 16. Further, in the present embodiment, for inclination detection, the arithmetic processing unit 13 includes a built-in weight change amount computing unit 131, an inclination angle computing unit 133, an inclination angle determining unit 134, and a warning unit 137. Details of the respective functions will be described later.

The memory 14 is a storage medium such as a memory card, an HDD, or the like. In the memory 14, various programs for computation of the arithmetic processing unit 13 are stored, and for inclination detection, a true weighing value (theoretical value) F of the built-in weight and an allowable inclination threshold θs of inclination angle are stored.

Figure 2:
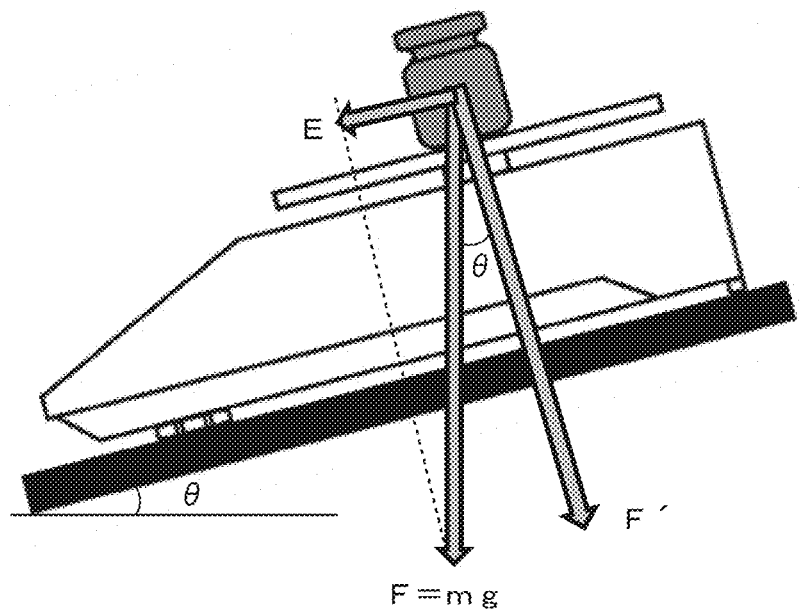
FIG. 2 is a view describing an inclination of a balance and a weighing value.

Here, a theory of a weighing value error of the balance will be considered. FIG. 2 is a view describing an inclination of a balance and a weighing value (measurement value that the balance displays on the display unit). When a weighing object is placed on the weighing pan and weighed, the balance measures a force perpendicular to the weight sensor and obtains a weighing value (displays the value). Therefore, when the balance is installed in an inclined state (angle θ), a force (arrow E) that the weight sensor cannot measure is generated, and a value F' that the balance displays (force measured by the balance) is displayed as a value smaller than a theoretical value of the weighing object (force F=mg in a gravitational acceleration direction), and F-F' is an inclination error. Therefore, when there is a weighing object whose theoretical value is known in advance, from a weighing value of the weighing object, an inclination angle of the apparatus can be known.

From the consideration above, in the present embodiment, the presence of the built-in weight whose theoretical value is known in advance is focused, and the built-in weight mounted for the purpose of automatic calibration is used for inclination detection.

Figure 3:
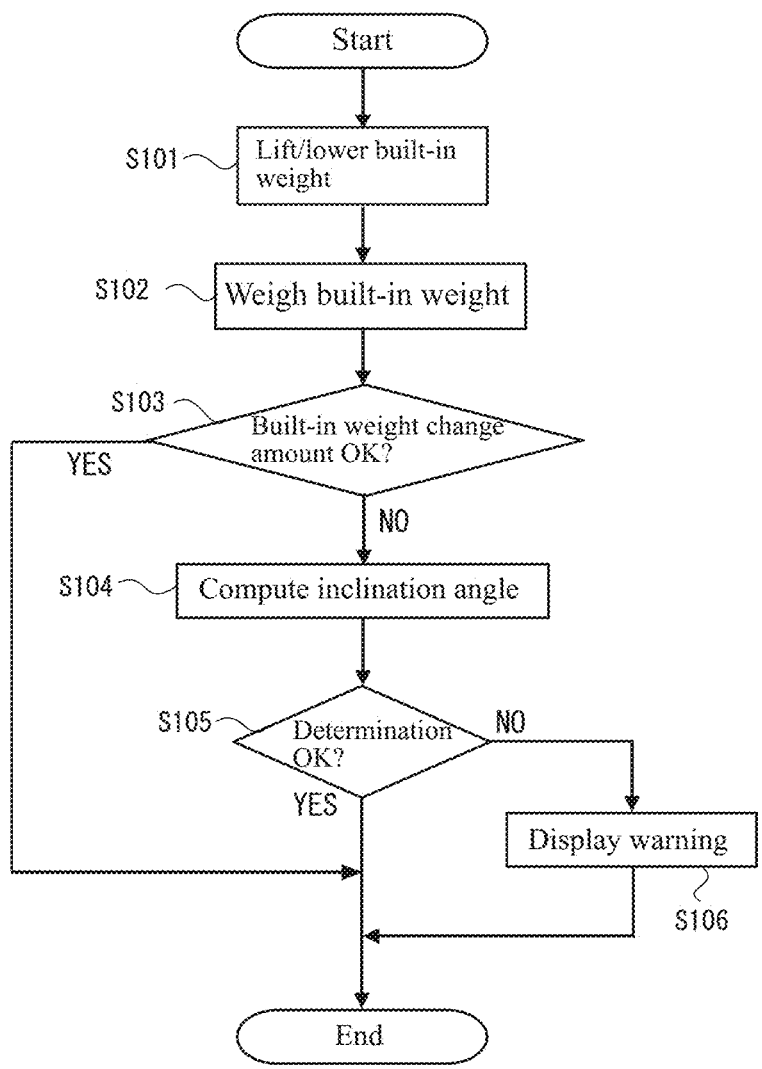
FIG. 3 is an inclination detection flowchart according to the first embodiment.

FIG. 3 is an inclination detection flowchart according to the first embodiment. The following flow is automatically started when a power supply is turned on, when the apparatus is not used for a predetermined period of time, or when an inclination detection application is started.

When inclination detection is started, first, in Step S101, the arithmetic processing unit 13 operates the adding/removing unit 18 to load/unload the built-in weight 17. At this time, it is also preferable that the number of times of loading/unloading is set according to the resolution of the weight sensor 12. The higher the resolution is, the higher the sensitivity is, and therefore, it is also preferable that the accuracy is improved by increasing the number of times of loading/unloading.

Next, the process shifts to Step S102, and the arithmetic processing unit 13 acquires a weighing value F' of the built-in weight 17.

Next, the process shifts to Step S103, and the built-in weight change amount computing unit 131 functions. The built-in weight change amount computing unit 131 reads the theoretical value F of the built-in weight 17 from the memory 14, and computes a built-in weight change amount F-F'. When the built-in weight change amount F-F' does not exceed an allowable range (Yes), it is determined that the built-in weight change amount F-F' poses no problem in weighing, and the process ends. When the built-in weight change amount F-F' exceeds the allowable range (No), the process shifts to Step S104.

When the process shifts to Step S104, the inclination angle computing unit 133 functions, and calculates an apparatus inclination angle θ from a numerical expression 1:

$$\theta = \cos^{-1}\left(\frac{F'}{F}\right)$$ [Numerical Expression 1]

Next, the process shifts to Step S105, and the inclination angle determining unit 134 functions and reads the allowable inclination threshold θs of inclination angle from the memory 14, and compares it with the apparatus inclination angle θ obtained in Step S104. The allowable inclination threshold θs can be determined from measurement specifications of the balance 10 and is set in advance, or it may be set by a user according to weighing way. When the inclination angle θ does not exceed the allowable inclination threshold θs (Yes), it is determined that the inclination angle θ poses no problem in weighing and the inclination detection ends, or the fact that there is no problem with weighing (no problem with the inclination) is displayed, and the process ends. On the other hand, when the inclination angle θ exceeds the allowable inclination threshold θs (No), it is determined that the apparatus needs to be leveled (has a problem), and the process shifts to Step S106.

Figure 4:
FIG. 4 is an example of warning display according to the first embodiment.

When the process shifts to Step S106, the warning unit 137 functions and displays a warning to prompt leveling on the display unit 16. FIG. 4 illustrates an example of warning display according to the first embodiment. For example, when the display unit 16 is a segment type, the warning unit 137 displays "LEVEL CH" as an abbreviation for Level check. When the display unit 16 is a liquid crystal screen, text to prompt leveling is displayed.

As above, according to the balance 10 of the present embodiment, the built-in weight 17 whose theoretical value has been stored in advance in the memory 14 for automatic calibration is focused, and automatic inclination detection is performed by obtaining an inclination angle of the balance 10 by using a weighing error of the built-in weight 17.

Here, focusing on the configuration of the balance 10, software processes of the built-in weight change amount computing unit 131, the inclination angle computing unit 133, the inclination angle determining unit 134, and the warning unit 137 are only added to the arithmetic processing unit 13 of the balance 10, and the number of assembling components (hardware components) of the balance 10 does not differ from that of an existing balance. Therefore, according to the balance 10 of the present embodiment, an inclination of the balance itself can be detected without an increase in the number of components. When the levelness of the apparatus influences weighing (has a problem), a warning to prompt leveling can be issued.

The built-in weight 17 is loaded/unloaded onto/from the same location (fixed position) by the adding/removing unit 18. The balance 10 uses a weighing value of the built-in weight 17 for inclination detection, and a weighing value can be obtained with high reproducibility, and according to this, an inclination angle can be calculated with high accuracy.

Second Embodiment

Figure 5:
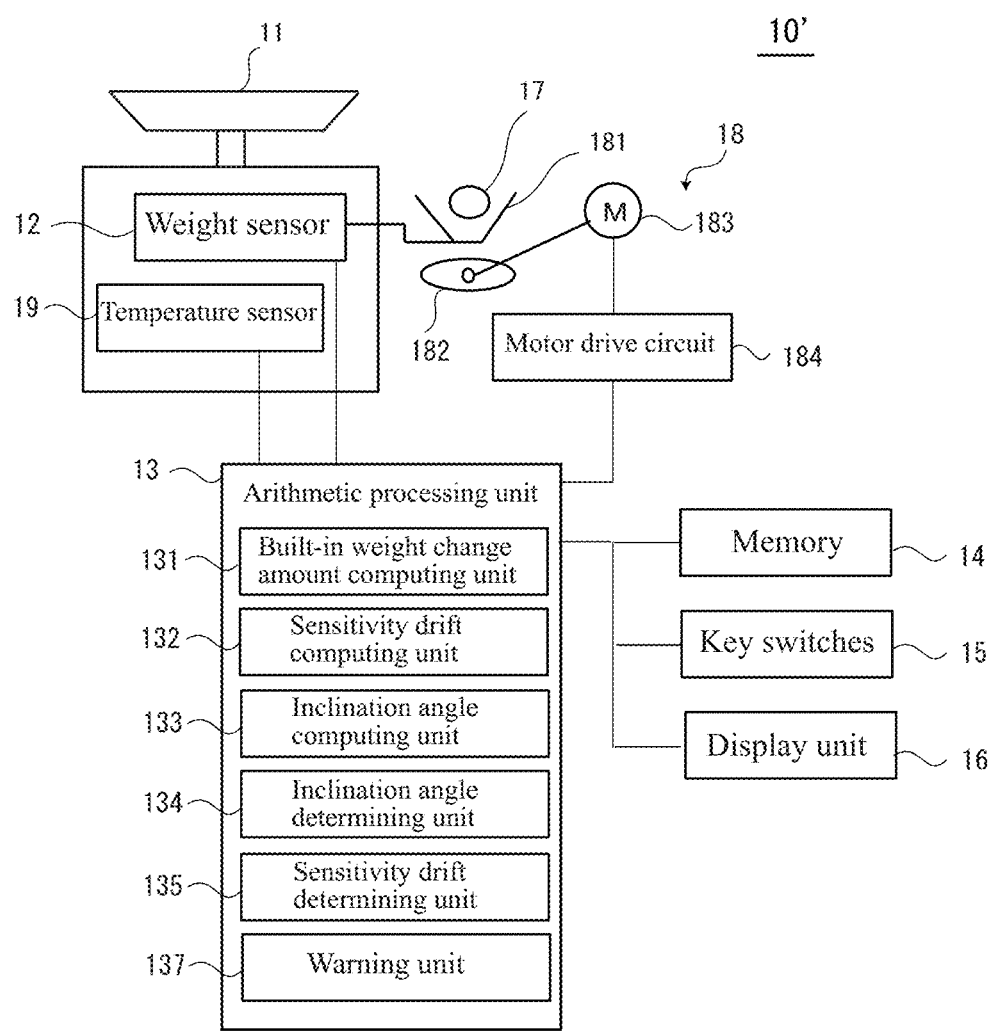
FIG. 5 is a configuration block diagram of a weighing apparatus according to a second embodiment.

FIG. 5 is a configuration block diagram of a weighing apparatus according to a second embodiment. For the same components as in the first embodiment, the same reference signs are cited, and description of the components are omitted.

The weighing apparatus according to the second embodiment (hereinafter, referred to as balance 10') includes the weighing pan 11, the weight sensor 12, the arithmetic processing unit 13, the memory 14, the key switches 15, the display unit 16, the built-in weight 17, the adding/removing unit 18, and further, a temperature sensor 19.

The temperature sensor 19 detects a temperature of an environment in which the balance 10' is disposed. Temperature data output from the temperature sensor 19 is A/D converted and output to the arithmetic processing unit 13.

The arithmetic processing unit 13 includes the built-in weight change amount computing unit 131, the inclination angle computing unit 133, the inclination angle determining unit 134, the warning unit 137, and further, a sensitivity drift computing unit 132 and a sensitivity drift determining unit 135. Details of the respective functions will be described later.

In the memory 14, for inclination detection, a theoretical value F of the built-in weight, an allowable threshold θs of inclination angle, a specification value x of sensitivity drift, and an allowable drift threshold xs of sensitivity drift are stored. Further, in the memory 14, each time a calibration is executed, a temperature measurement value of the temperature sensor 19 at the time of the calibration is stored.

Here, a weighing value error of the balance will be further considered. Causes of a change in weighing value from a true value include, in addition to an inclination error, sensitivity drift of the weight sensor caused by a temperature change. Concerning the sensitivity drift, specifications have been determined for each balance, so that a maximum value according to a sensitivity change can be obtained. A maximum value of a weighing value change amount caused by sensitivity drift is obtained by a numerical expression 2.

Here, $W_T$: Maximum value [g] of weighing value change amount caused by temperature change
F: Theoretical value [g] of built-in weight
x: Specification value [ppm/° C.] of sensitivity drift
$T_P$: Temperature [° C.] in previous calibration
$T_N$: Current temperature [° C.]

$$W_T = F \times x \text{ (ppm)} \times (T_P - T_N)$$ [Numerical Expression 2]

From the above consideration, in the present embodiment, inclination detection is performed by utilizing a maximum value of sensitivity drift (a weighing value change amount caused by a temperature change) and taking into consideration a sensitivity change caused by the temperature change.

Figure 6:
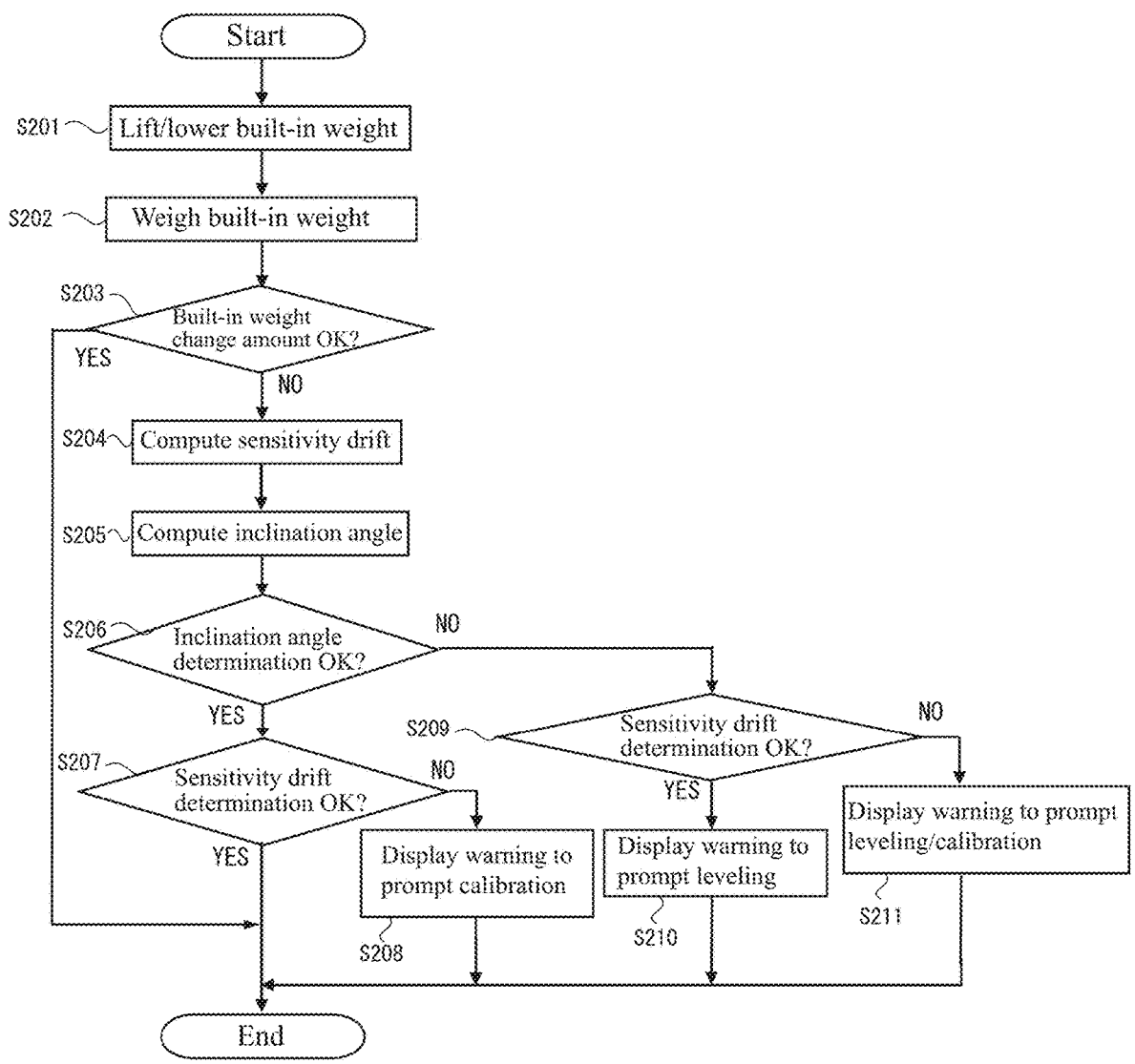
FIG. 6 is an inclination detection flowchart according to the second embodiment.
Figure 7:
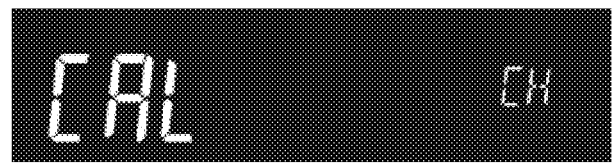
FIG. 7 is an example of warning display according to the second embodiment.
Figure 8:
FIG. 8 is another example of warning display according to the second embodiment.
Figure 9:
FIG. 9 is still another example of warning display according to the second embodiment.

FIG. 6 is an inclination detection flowchart according to the second embodiment. FIGS. 7, 8, and 9 illustrate examples of warning display according to the second embodiment. The following flow is automatically started when a power supply is turned on, when the apparatus is not used for a predetermined period of time, or when an inclination detection application is started. For the same steps as in the first embodiment, the same reference signs are cited, and description of the steps are omitted.

When inclination detection is started, in Step S201, the arithmetic processing unit 13 operates the adding/removing unit 18 to load/unload the built-in weight 17 as in Step S101.

Next, the process shifts to Step S202, and the arithmetic processing unit 13 acquires a weighing value F' of the built-in weight 17 as in Step S102.

Next, the process shifts to Step S203, and the built-in weight change amount computing unit 131 computes a built-in weight change amount F-F' as in Step S103. When the built-in weight change amount F-F' does not exceed an allowable range (Yes), it is determined that the built-in weight change amount F-F' poses no problem in weighing, and the process ends. When the built-in weight change amount F-F' exceeds the allowable range (No), the process shifts to Step S204.

When the process shifts to Step S204, the sensitivity drift computing unit 132 functions and acquires a current temperature measurement value from the temperature sensor 19, reads a temperature measurement value in a previous calibration and the sensitivity drift specification value x from the memory 14, and computes a sensitivity drift value (a maximum value of a weighing value change amount caused by the temperature change) $W_T$ from the numerical expression 2.

Next, the process shifts to Step S205, and from a numerical expression 3, the inclination angle computing unit 133 calculates an apparatus inclination angle θ by subtracting the sensitivity drift value.

$$\theta = \cos^{-1}\left(\frac{F'}{F - W_T}\right) \qquad \text{[Numerical Expression 3]}$$

Next, the process shifts to Step S206, and the inclination angle determining unit 134 functions and reads the allowable inclination threshold θs of inclination angle from the memory 14, and compares it with the apparatus inclination angle θ obtained in Step S205. When θ does not exceed θs (Yes), it is determined that there is no problem with the inclination angle and the process shifts to Step S207. On the other hand, when θ exceeds θs (No), it is determined that there is a problem with the inclination angle and/or sensitivity drift, and the process shifts to Step S209.

When the process shifts to Step S207, it has been determined that there is no problem with the inclination, so that the sensitivity drift determining unit 135 functions and checks whether there is a problem with the sensitivity drift. The sensitivity drift determining unit 135 reads the allowable drift threshold xs from the memory 14 and compares it with the sensitivity drift value $W_T$ obtained in Step S204. When $W_T$ does not exceed xs (Yes), it is determined that neither the inclination nor the sensitivity drift poses a problem in weighing, and the process ends as is, or the fact that weighing is normal is displayed and the process ends. On the other hand, when $W_T$ exceeds xs (No), it is determined that there is no problem with the inclination but there is a problem with the sensitivity drift, and the process shifts to Step S208.

In Step S208, since it has been determined that there is a problem with the sensitivity drift, a calibration to eliminate the sensitivity drift needs to be executed. FIG. 7 illustrates an example of warning display in Step S208. For example, when the display unit 16 is a segment type, the warning unit 137 displays "CAL CH" as an abbreviation for Calibration check. When the display unit 16 is a liquid crystal touch panel, text to prompt a calibration is displayed.

On the other hand, in the case where the process has shifted to Step S209, there is a problem with the inclination and/or sensitivity drift. Therefore, the sensitivity drift determining unit 135 functions, and as in Step S207, checks whether there is a problem with the sensitivity drift. When $W_T$ does not exceed xs (Yes), it is determined that there is no problem with the sensitivity drift and there is a problem only with the inclination, and the process shifts to Step S210. When $W_T$ exceeds xs in Step S209 (No), it is determined that there are problems with both inclination and sensitivity drift, and the process shifts to Step S211.

In Step S210, it has been determined that there is no problem with the sensitivity drift and there is a problem with the inclination, so that it is necessary to execute leveling. FIG. 8 illustrates an example of warning display in Step S210. For example, when the display unit 16 is a segment type, the warning unit 137 displays "LEVEL CH" as an abbreviation for Level check. When the display unit 16 is a liquid crystal touch panel, text to prompt leveling is displayed.

In Step S211, it has been determined that there are problems with both inclination and sensitivity drift, so that it is necessary to execute both leveling and calibration. FIG. 9 illustrates an example of warning display in Step S211. For example, when the display unit 16 is a segment type, the warning unit 137 displays "L And C CH" as an abbreviation for Level and Calibration check. When the display unit 16 is a liquid crystal touch panel, text to prompt leveling and a calibration after leveling is displayed.

As above, according to the balance 10' of the present embodiment, inclination detection is performed by obtaining an inclination angle of the balance 10' after eliminating a sensitivity drift maximum value by using also a value of the temperature sensor 19. Then, the apparatus automatically determines whether a weighing error is due to an inclination or a sensitivity change caused by a temperature change, and issues a warning according to the determination.

Here, focusing on the configuration of the balance 10', the temperature sensor 19 is mounted in advance on many balances basically for automatic calibration, so that software processes of the sensitivity drift computing unit 132 and the sensitivity drift determining unit 135 are only added to the arithmetic processing unit 13 of the balance 10', and the number of assembling components (hardware components) of the balance 10' does not differ from that of an existing balance. Therefore, even further taking into consideration a temperature change in addition to the inclination detection, the number of components of the balance 10' of the present embodiment does not increase.

Third Embodiment

Figure 10:
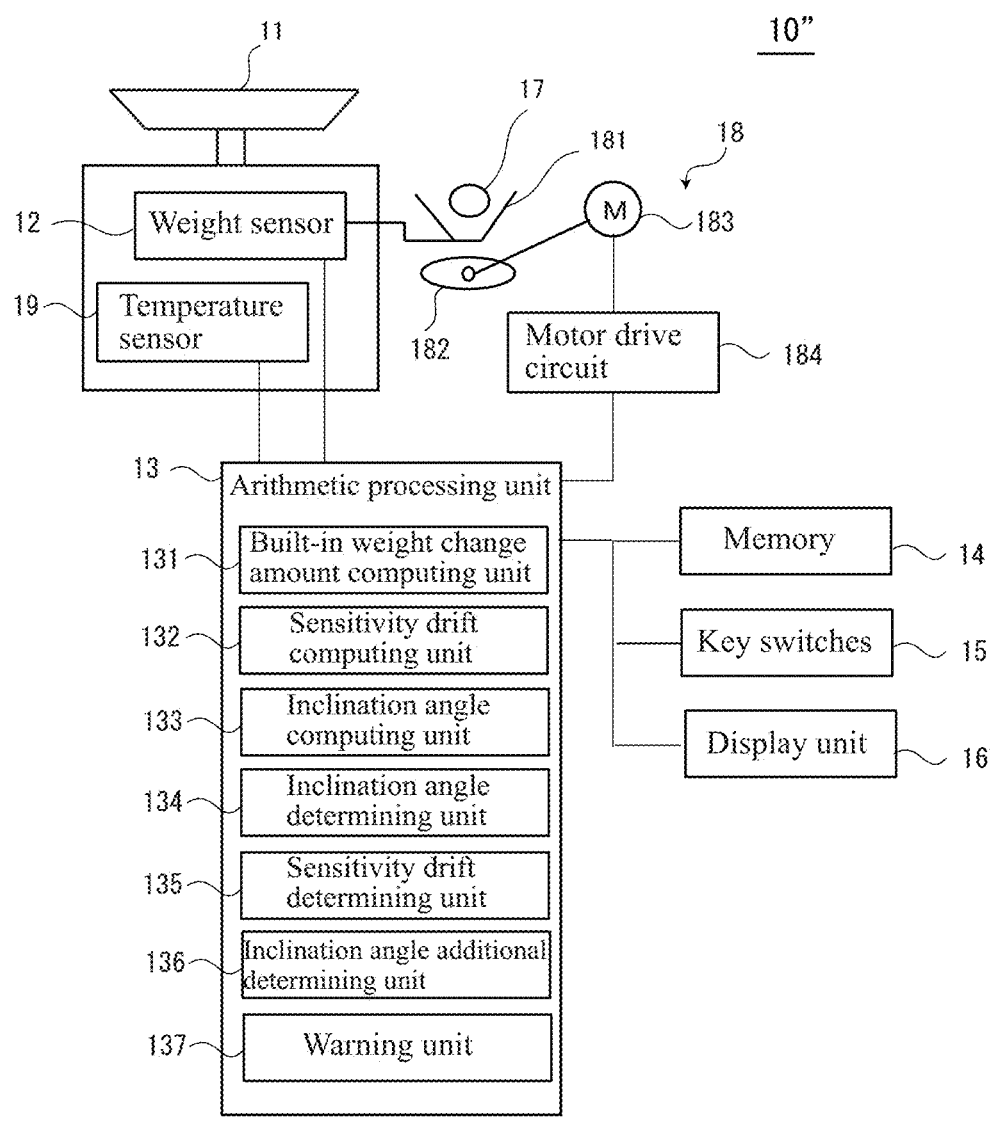
FIG. 10 is a configuration block diagram of a weighing apparatus according to a third embodiment.

FIG. 10 is a configuration block diagram of a weighing apparatus according to a third embodiment. For the same components as in the embodiments described above, the same reference signs are cited, and description of the components are omitted.

The weighing apparatus according to the third embodiment (hereinafter, referred to as balance 10") includes, as in the second embodiment, the weighing pan 11, the weight sensor 12, the arithmetic processing unit 13, the memory 14, the key switches 15, the display unit 16, the built-in weight 17, the adding/removing unit 18, and the temperature sensor 19.

The arithmetic processing unit 13 includes the built-in weight change amount computing unit 131, the sensitivity drift computing unit 132, the inclination angle computing unit 133, the inclination angle determining unit 134, the sensitivity drift determining unit 135, the warning unit 137, and further, an inclination angle additional determining unit 136. Details of this function will be described later.

In the memory 14, a theoretical value F of the built-in weight, an allowable inclination threshold θs1 of inclination angle, an inclination abnormality threshold θs2 set to be higher than the allowable inclination threshold θs1, a specification value x of sensitivity drift, an allowable drift threshold xs of sensitivity drift, and a temperature measurement value of the temperature sensor 19 at the time of a calibration, are stored.

Here, a weighing value error of the balance will be further considered. Causes of a change in weighing value from a true value include, in addition to an inclination error and sensitivity drift caused by a temperature change, a change in gravitational acceleration caused by an installation location change. A change in gravitational acceleration caused by an installation location change is a change in gravitational acceleration "g" of F=mg in FIG. 2. As a detailed example, when a weighing apparatus calibrated with a weight of 100.000 g at a certain location in Ibaraki Pref., is installed at a certain location in northern Japan, the weighing value of the weight changes to 100.051 g (+0.051 g), and when the apparatus is installed at a certain location in southern Japan, the weighing value of the weight changes to 99.908 g (−0.092 g).

In the present embodiment, the inclination detection is performed so that, when the inclination determination result is clearly abnormal, a change in gravitational acceleration is suspected.

Figure 11:
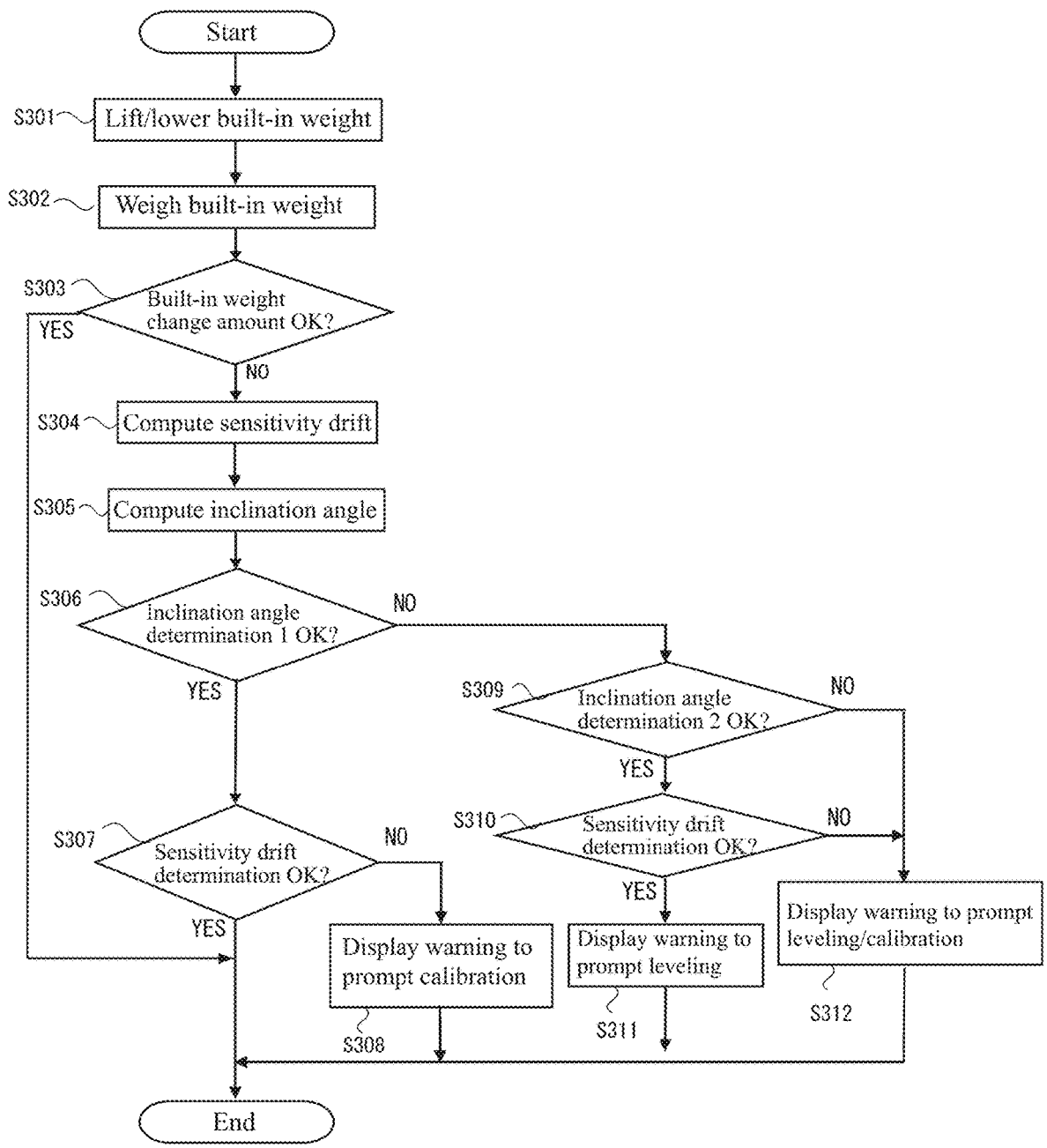
FIG. 11 is an inclination detection flowchart according to the third embodiment.

FIG. 11 is an inclination detection flowchart according to the third embodiment. The following flow is automatically started when a power supply is turned on, when the apparatus is not used for a predetermined period of time, or when an inclination detection application is started. For the same steps as in the second embodiment, the same reference signs are cited, and description of the steps are omitted.

When the inclination detection is started, the arithmetic processing unit 13 performs the same processes as in Steps S201 to S205 of the second embodiment in Steps S301 to S305. That is, the built-in weight 17 is loaded/unloaded in Step S301, a weighing value F' of the built-in weight 17 is acquired in Step S302, a built-in weight change amount F-F' is computed in Step S303, a sensitivity drift $W_T$ is computed from the numerical expression 2 in Step S304, and in Step S305, from the numerical expression 3, an apparatus inclination angle θ is calculated by subtracting the sensitivity drift value.

Next, the process shifts to Step S306, and the inclination angle determining unit 134 performs the same process as in Step S206 as "Inclination angle determination 1." That is, the inclination angle determining unit 134 reads the allowable inclination threshold θs1 of inclination angle from the memory 14, compares the inclination angle θ obtained in Step S305 with the allowable inclination threshold θs1, and when θ does not exceed θs1 (Yes), the process shifts to Step S307, and when θ exceeds θs1 (No), the process shifts to Step S309.

When the process shifts to Step S307, it has been determined that there is no problem with the inclination angle, and the sensitivity drift determining unit 135 performs the same processes as in Steps S207 and S208. That is, the sensitivity drift determining unit 135 checks whether there is a problem with the sensitivity drift by comparing the sensitivity drift value $W_T$ obtained in Step S304 with the allowable drift threshold xs. When $W_T$ does not exceed xs (Yes), it is determined that neither the inclination nor the sensitivity drift poses a problem in weighing, and the process ends as is, or the fact that weighing is normal is displayed and the process ends. When $W_T$ exceeds xs (No), it is determined that there is no problem with the inclination but there is a problem with the sensitivity drift, and the process shifts to Step S308. In Step S308, the warning unit 137 issues a warning to prompt a calibration to eliminate the sensitivity drift (FIG. 7).

On the other hand, when the process shifts to Step S309, the inclination angle additional determining unit 136 functions. As "Inclination angle determination 2," the inclination angle additional determining unit 136 reads the inclination abnormality threshold θs2 of inclination angle from the memory 14, and compares the inclination angle θ obtained in Step S305 with the inclination abnormality threshold θs2 of inclination angle.

Here, the inclination abnormality threshold θs2 of inclination angle is set to a value showing a clearly large inclination. For example, when the inclination angle is 5°, the apparatus has reached a state where the apparatus has such an inclination that an operator can know by a visual check, and it is considered normally impossible that the inclination angle θ exceeds the inclination abnormality threshold θs2. Therefore, when the inclination angle θ calculated in Step S305 exceeds the inclination abnormality threshold θs2, the inclination is determined to be clearly abnormal, and another cause, that is, a change in gravitational acceleration is suspected.

Therefore, in the "Inclination angle determination 2" in Step S309, when θ exceeds θs2 (No), the inclination is determined to be excessively large, and a change in gravitational acceleration is suspected in addition to the inclination, and the process shifts to Step S312. After the process shifts to Step S312, the warning unit 137 issues a warning to prompt both leveling and calibration to correct both inclination and change in gravitational acceleration that are likely to have occurred (FIG. 9).

On the other hand, in the "Inclination angle determination 2" in Step S309, when θ does not exceed θs2 (Yes), the inclination is determined not to be clearly abnormal, and whether there is a problem with the sensitivity drift is checked as in Steps S209 to S211. That is, in Step S310, the sensitivity drift determining unit 135 checks the sensitivity drift, and when there is no problem with the sensitivity drift ($W_T$ does not exceed xs, Yes), it is determined that there is a problem with the inclination, and the warning unit 137 issues a warning to prompt leveling (FIG. 8). When the sensitivity drift determining unit 135 determines that there is a problem with the sensitivity drift ($W_T$ exceeds xs, No), it is determined that there are problems with both inclination and sensitivity drift, and the warning unit 137 issues a warning to prompt both leveling and calibration (FIG. 9).

As above, according to the balance 10" of the present embodiment, an inclination abnormality threshold θs2 for suspecting a change in gravitational acceleration is set, and the apparatus automatically determines whether a weighing error is due to an inclination, a sensitivity change, or a change in gravitational acceleration, and issues a warning according to the determination.

Here, focusing on the configuration of the balance 10″ of the present embodiment, a software process of the inclination angle additional determining unit 136 is only added to the arithmetic processing unit 13 of the balance 10, and the number of assembling components (hardware components) does not differ from that of an existing balance. Therefore, even further taking into consideration a temperature change and a change in gravitational acceleration in addition to the inclination detection, the number of components of the balance 10 of the present embodiment does not increase.

Preferred embodiments and modifications of the present invention have been described above, and the respective embodiments and modifications can be combined based on knowledge of a person skilled in the art, and such a combined embodiment is included in the scope of the present invention.

REFERENCE SIGNS LIST

- 10 Balance (weighing apparatus)
- 11 Weighing pan
- 12 Weight sensor
- 13 Arithmetic processing unit
  - 131 Built-in weight change amount computing unit
  - 132 Sensitivity drift computing unit
  - 133 Inclination angle computing unit
  - 134 Inclination angle determining unit
  - 135 Sensitivity drift determining unit
  - 136 Inclination angle additional determining unit
  - 137 Warning unit
- 14 Memory
- 16 Display unit
- 17 Built-in weight
- 18 Adding/removing unit
- 19 Temperature sensor

The invention claimed is:

1. A weighing apparatus comprising:
a weight sensor;
a built-in weight to be loaded on the weight sensor;
an adding/removing unit for adding/removing the built-in weight;
a memory storing a theoretical value of the built-in weight; and
an arithmetic processing unit, wherein
the arithmetic processing unit includes
an inclination angle computing unit configured to obtain an apparatus inclination angle from an arc-cosine of a weighing value of the built-in weight and the theoretical value of the built-in weight.

2. The weighing apparatus according to claim 1, wherein the arithmetic processing unit further includes an inclination angle determining unit configured to compare the apparatus inclination angle with an allowable inclination threshold, and a warning unit configured to issue a warning to prompt leveling when the inclination angle determining unit determines that there is a problem.

3. The weighing apparatus according to claim 1, further comprising a temperature sensor, wherein
a specification value of sensitivity drift caused by a temperature change and a temperature measurement value of the temperature sensor are stored in the memory,
the arithmetic processing unit includes a sensitivity drift computing unit configured to compute a sensitivity drift value by multiplying the theoretical value of the built-in weight by the specification value of the sensitivity drift and a difference between a current temperature measurement value of the temperature sensor and a temperature measurement value acquired at the time of execution of a previous calibration, and
the inclination angle computing unit obtains the apparatus inclination angle after subtracting the sensitivity drift value from the theoretical value of the built-in weight.

4. The weighing apparatus according to claim 3, wherein the arithmetic processing unit further includes an inclination angle determining unit configured to compare the apparatus inclination angle with an allowable inclination threshold, a sensitivity drift determining unit configured to compare the sensitivity drift value with an allowable drift threshold when the inclination angle determining unit determines that there is a problem, and a warning unit configured to issue a warning to prompt leveling when the inclination angle determining unit determines that there is a problem, and issue a warning to prompt a calibration when the sensitivity drift determining unit determines that there is a problem.

5. The weighing apparatus according to claim 2, wherein
an inclination abnormality threshold for suspecting a change in gravitational acceleration caused by an installation location change is further stored in the memory,
the arithmetic processing unit includes an inclination angle additional determining unit configured to compare the apparatus inclination angle with the inclination abnormality threshold, and
the warning unit issues a warning to prompt a calibration for correcting a change in gravitational acceleration when the inclination angle additional determining unit determines that there is a problem.

6. An inclination detecting method comprising:
a step (A) of adding/removing a built-in weight to/from a weight sensor;
a step (B) of calculating a weighing value of the built-in weight; and
a step (C) of obtaining an apparatus inclination angle from an arc-cosine of the weighing value of the built-in weight and a theoretical value of the built-in weight.

7. The inclination detecting method according to claim 6, further comprising:
a step (D) of issuing a warning to prompt leveling when the apparatus inclination angle exceeds an allowable inclination threshold.

8. The inclination detecting method according to claim 6, comprising:
before the step (C), a step (E) of computing a sensitivity drift value by multiplying the theoretical value of the built-in weight by a specification value of the sensitivity drift and a difference between a current temperature measurement value of the temperature sensor and a temperature measurement value acquired at the time of execution of a previous calibration, wherein
in the step (C), the apparatus inclination angle is obtained after subtracting the sensitivity drift value from the theoretical value of the built-in weight.

9. The inclination detecting method according to claim 8, further comprising:
a step (F) of issuing a warning to prompt a calibration when the sensitivity drift value in the step (E) exceeds an allowable drift threshold.

10. The inclination detecting method according to claim 7, further comprising:
after the step (C), a step (G) of prompting a calibration for correcting a change in gravitational acceleration when the apparatus inclination angle exceeds an inclination abnormality threshold for suspecting a change in gravitational acceleration caused by an installation location change.

11. The weighing apparatus according to claim 4, wherein an inclination abnormality threshold for suspecting a change in gravitational acceleration caused by an installation location change is further stored in the memory, the arithmetic processing unit includes an inclination angle additional determining unit configured to compare the apparatus inclination angle with the inclination abnormality threshold, and the warning unit issues a warning to prompt a calibration for correcting a change in gravitational acceleration when the inclination angle additional determining unit determines that there is a problem.

12. The inclination detecting method according to claim 9, further comprising:

after the step (C), a step (G) of prompting a calibration for correcting a change in gravitational acceleration when the apparatus inclination angle exceeds an inclination abnormality threshold for suspecting a change in gravitational acceleration caused by an installation location change.

13. The weighing apparatus according to claim 1, wherein the inclination angle computing unit is configured to obtain an apparatus inclination angle from an arc-cosine determined by a difference between a weighing value of the built-in weight and the theoretical value of the built-in weight.

14. The inclination detecting method of claim 6, wherein the apparatus inclination angle from an arc-cosine is determined by calculating a difference between a weighing value of the built-in weight and the theoretical value of the built-in weight.

* * * * *